United States Patent [19]

Yamada

[11] Patent Number: 5,558,402
[45] Date of Patent: Sep. 24, 1996

[54] SEAT RECLINING APPARATUS

[75] Inventor: Yukifumi Yamada, Toyota, Japan

[73] Assignee: Aisin Seiki Kabushiki Kaisha, Kariya, Japan

[21] Appl. No.: 360,886

[22] Filed: Dec. 21, 1994

[30]     Foreign Application Priority Data

Dec. 22, 1993  [JP]  Japan ................... 5-324796

[51]  Int. Cl.⁶ ................. B60N 2/20; B60N 2/22
[52]  U.S. Cl. ................ 297/363; 297/367; 297/365
[58]  Field of Search ................... 297/367, 369, 297/363, 364, 365, 360

[56]                References Cited

U.S. PATENT DOCUMENTS

| | | | |
|---|---|---|---|
| 4,269,447 | 5/1981 | Dottori | 297/367 X |
| 4,348,050 | 9/1982 | Letournoux et al. | 297/367 X |
| 4,523,786 | 6/1985 | Letournoux | 297/367 |
| 4,629,251 | 12/1986 | Tezuka | 297/367 X |
| 4,765,680 | 8/1988 | Kawashima | 297/367 |
| 4,789,205 | 12/1988 | Pipon | 297/367 |

FOREIGN PATENT DOCUMENTS

| | | | |
|---|---|---|---|
| 51819 | 8/1974 | Australia | 297/367 |
| 694400 | 9/1930 | France | 297/367 |
| 1555301 | 7/1970 | Germany | 297/367 |
| 2412405 | 12/1974 | Germany | 297/363 |
| 58-38511 | 3/1983 | Japan . | |
| 1088689 | 10/1967 | United Kingdom | 297/369 |
| 1333756 | 10/1973 | United Kingdom | 297/367 |

*Primary Examiner*—Peter R. Brown
*Assistant Examiner*—David E. Allred
*Attorney, Agent, or Firm*—Finnegan, Henderson, Farabow, Garrett and Dunner

[57]                ABSTRACT

A seat reclining apparatus includes a lower arm for attaching or fixing a seat-cushion, an upper arm for attaching or fixing a seat-back, a shaft rotatably disposed in the lower arm and fixed to rotate with the upper arm, a locking mechanism disposed between the lower arm and the upper arm and having a ratchet and a pawl, the pawl being movable toward and away from the ratchet for establishing a meshing engagement therebetween and releasing the meshing engagement, respectively, and a regulating gear configured at least as large as one of the ratchet and the pawl in a pitch circle and adjacent to the other of the ratchet and the pawl so as to be engagable with one of the ratchet and the pawl while the pawl is in meshing engagement with the ratchet.

3 Claims, 3 Drawing Sheets

SEAT RECLINING APPARATUS

BACKGROUND OF THE INVENTION

1. Field of Invention

The present invention relates to a seat reclining apparatus.

2. Description of Related Art

Japanese Patent Laid-open Print No. Sho58-38511 published on Mar. 7, 1983 without examination discloses a seat reclining apparatus which includes a lower arm for attaching or fixing a seat-cushion, an upper arm for attaching or fixing a seat-back, a shaft pivotally attaching the upper arm to the lower arm, and a locking mechanism having a combination pawl and ratchet disposed between the lower arm and the upper arm. The pawl is positioned between a pair of spaced walls which are provided at the lower arm in order to oppose the ratchet. The meshing engagement of the pawl with the ratchet prevents the seat-back from rotating relative to the seat-cushion. When the meshing engagement between the pawl and the ratchet is released by moving the pawl away from the ratchet, the seat-back becomes rotatable relative to the seat- cushion. In order to facilitate a more or less smooth movement of the ratchet along the walls, a clearance is provided between the ratchet and each of the walls.

In the foregoing structure, in order to ensure that the meshing engagement between the pawl and ratchet is maintained even when a large force or load is applied to the seat-back in the direction of the rotation thereof relative to the seat-cushion, the clearance should be set as small as possible. However, the establishment of such a minimum clearance is difficult.

SUMMARY OF THE INVENTION

It is, therefore, a primary object of the present invention to provide a seat reclining apparatus without the foregoing drawback.

Additional features and advantages of the invention will be set forth in the description which follows and in part will be apparent from the description or be allowed by practice of the invention. The objectives and other advantages of the invention will be realized and attained by the apparatus particularly pointed out in the written description and claims hereof as well as the appended drawings.

To achieve these and other advantages and in accordance with the purpose of the invention as embodied and broadly described, the invention is a seat reclining apparatus including a lower arm for fixing a seat-cushion, an upper arm for fixing a seat-back, a shaft rotatably disposed in the lower arm and fixed to the upper arm for unitary rotation therewith, a locking mechanism disposed between the lower arm and the upper arm and having a ratchet and a pawl, the pawl being movable toward and away from the ratchet for establishing a meshing engagement therebetween and releasing the meshing engagement, respectively, and a regulating gear set at least as large as one of the ratchet and the pawl in a pitch circle and adjacent to the other of the ratchet and the pawl so as to be engagable with one of the ratchet and the pawl while the pawl is meshing engagement with the ratchet.

It is to be understood that both the foregoing general description and the following detailed description are exemplary and explanatory and are intended to provide further explanation of the invention as claimed.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DESCRIPTION OF THE PREFERRED EMBODIMENT

A preferred embodiment of the present invention will be described in detail with reference to the accompanying drawings.

Figure 1:
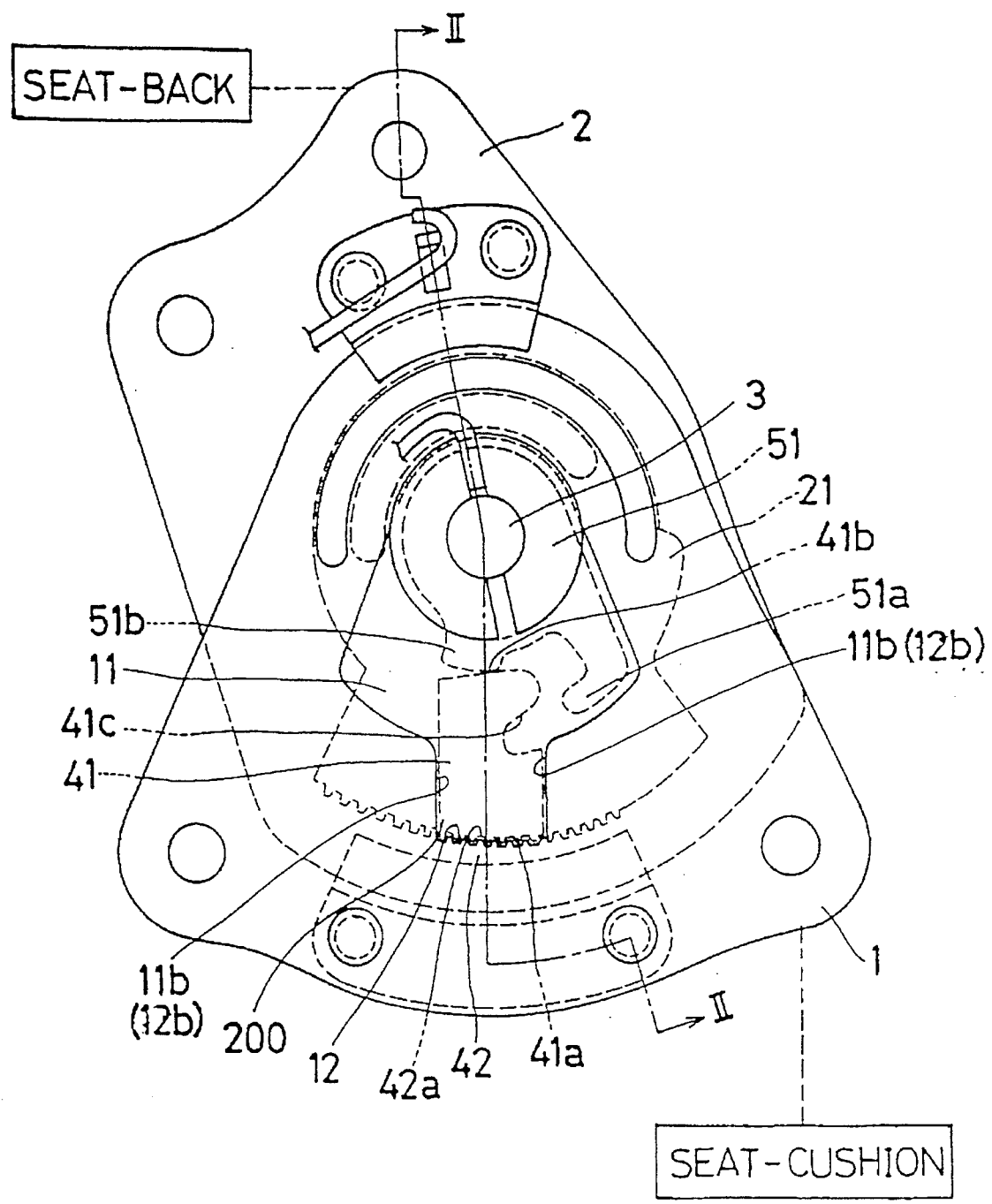
FIG. 1 is a side view of a seat reclining apparatus according to a preferred embodiment of the present invention.
Figure 2:
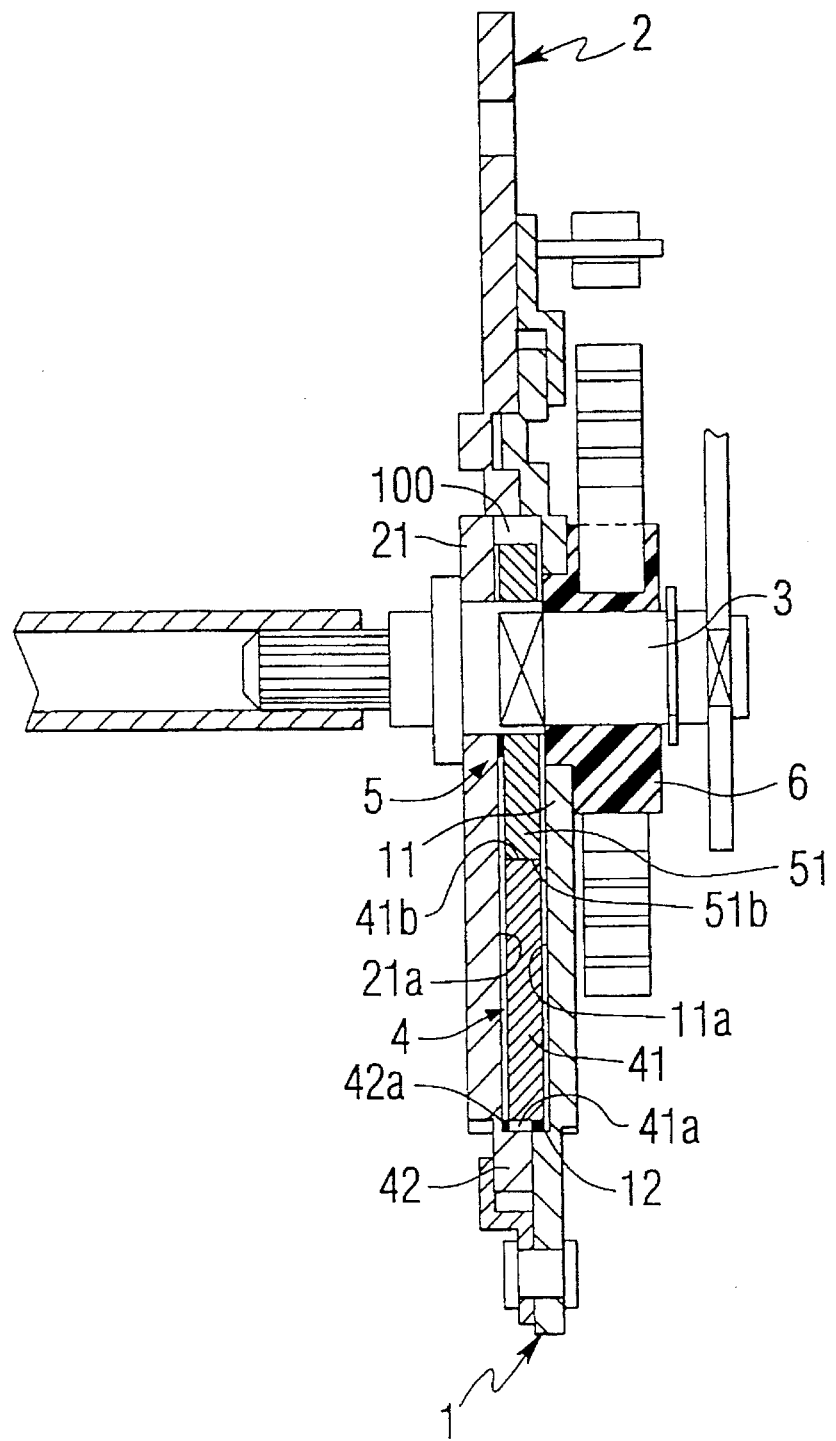
FIG. 2 is a cross-sectional view taken along line II—II in FIG. 1.
Figure 3:
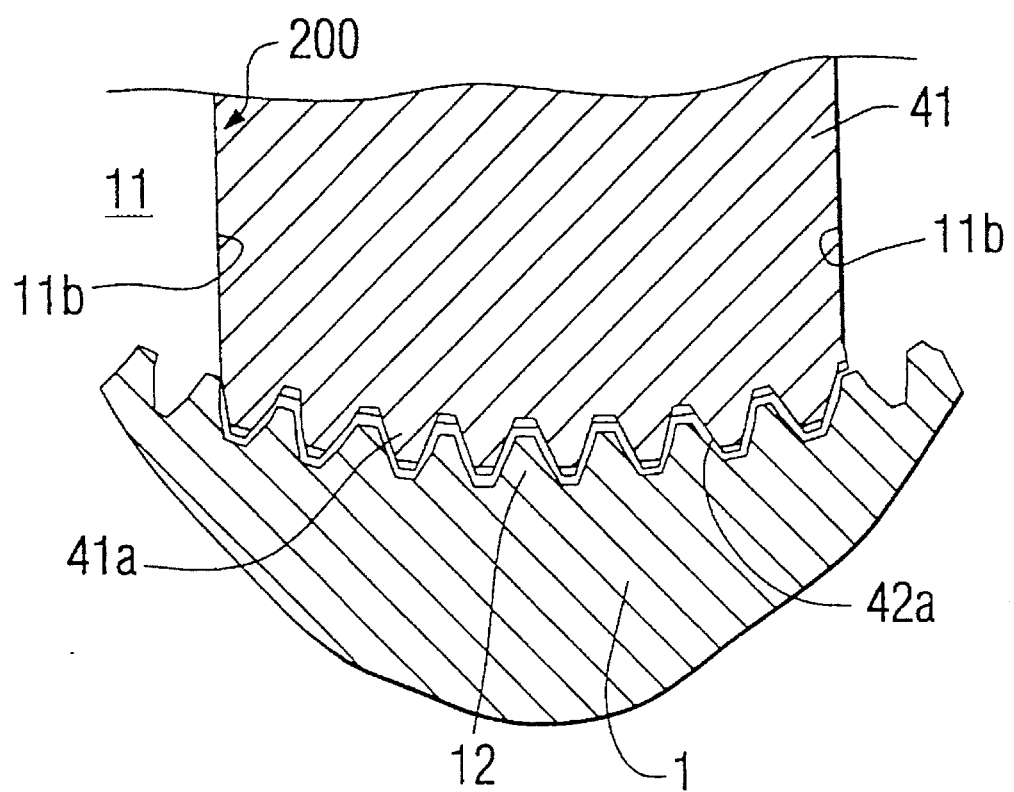
FIG. 3 shows a principal portion of the seat reclining apparatus shown in FIG. 1.

Referring to FIGS. 1 to 3 inclusive, a seat reclining apparatus includes a lower arm 1 for attaching to or fixing a seat cushion. The lower arm 1 is formed with a supporting portion 11 defining a leftward facing opening as viewed in FIG. 2. An upper arm 2 for attaching to or fixing a seat-back is also formed with a supporting portion 21 which defines a rightward facing opening as viewed in FIG. 2. The lower arm 1 and the upper arm 2 are arranged in a side-by-side relationship, thereby establishing a space 100 between the supporting portions 11 and 21. A shaft 3 passes through the supporting portions 11 and 21 of the lower arm 1 and the upper arm 2, respectively, in such a manner that the lower arm 1 is supported on the shaft 3 via a bushing 6 and the upper arm 2 is set rotatable about the shaft 3 so as to form a reclining angle relative to the lower arm 1. A locking mechanism 4 and a releasing mechanism 5 are provided within the space 100.

The locking mechanism 4 includes a pawl 41 having a geared portion 41a whose curvature is co-axial with the shaft 3, and a ratchet 42 having a geared portion 42a whose curvature is co-axial with the shaft 3. The supporting portion 11 is provided with a groove defined by a pair of spaced walls 11b (see FIG. 3). The supporting portion 21 is provided with a groove defined by a pair of spaced walls 12b which are co-planer with the walls 11b, respectively. These grooves constitute a slot 200 in which the pawl 41 is accommodated and loosely fitted so as to be in sliding engagement with the walls 11b, 12b. Thus, as a whole, the pawl 41 is movably held in the lower arm 1 so as to be engaged with and disengaged from the ratchet 42. The ratchet 42 is formed in such a manner that the geared portion 42a of ratchet 42 is formed integrally with an inner periphery of the supporting portion 21 of the upper arm 2.

The releasing mechanism 5 includes a cam 51. The cam 51 is mounted on the shaft 3 so as to be rotatable therewith in unison. The cam 51 has a projection 51b. The projection 51b is positioned to be brought into engagement with and disengaged from a back surface 41b of the pawl 41 when the cam 51 is rotated. The cam 51 also has a leg 51a which is formed to be brought into engagement with a cam portion 41c of the pawl 41 when the projection 51b of the cam 51 is released from the back surface 41b of the pawl 41.

A regulating geared portion 12 is formed integrally with and along an inner periphery of the supporting portion 11 of the lower arm 1. The regulating geared portion 12 is set to be equal to or larger than the geared portion 42a of the ratchet 42 in a pitch circle. The regulating geared portion 12 acts, as it were, as a shift gear. The geared portion 12 is positioned adjacent to the geared portion 42a of ratchet 42. Thus, while each tooth of the geared portion 41a of the pawl 41 is abutting two adjacent teeth of the geared portion 42a of the ratchet 42 (as best illustrated in FIG. 3), each tooth of the geared portion 41a of the pawl 41 is fitted with backlash between two adjacent teeth of the regulating geared portion 12, respectively.

In the illustrated condition, the projection 51b of the cam 51 is in engagement with the back surface 41b of the pawl 41, which holds the geared portion 41a of the pawl 41 and each of the geared portions 42a of the ratchet 42 in meshing engagement. Thus, a rotation of the upper arm 2 about the shaft 3 relative to the lower arm 1 is feasible. When the shaft 3 is rotated in the clockwise direction of FIG. 1, the cam 51 is rotated concurrently an the same direction, thereby releasing the projection 51b of the cam 51 from the back surface 41b of the pawl 41. Simultaneous with the resulting disengagement, the leg 51a of the cam 51 under rotation is brought into engagement with the cam portion 41c of the pawl 41, thereby moving the pawl 41 away from the ratchet 42 and the regulating geared portion 12. Thus, the resulting condition allows the upper arm 2 to rotate relative to the lower arm 1 about the shaft 3. After such a rotation, if the operation is reversed, the illustrated condition is established.

If the upper arm 2 is applied with a force or load for the rotation thereof while the upper arm 2 is being prevented from being rotated relative to the lower arm i as illustrated, such a force or load is received at the meshing engagement between the geared portion 41a and the geared portion 42a of the ratchet 42. The resultant meshing load therebetween ultimately is received by the walls 11b of the lower arm 1. Thus, even with the foregoing force or load, the illustrated position of the upper arm 2 relative to the lower arm 1 can remain unchanged. If the force or load is too large to be received at the meshing engagement between the geared portion 41a and the geared portion 42a of the ratchet 42, one or more teeth of the geared portion 42a of the ratchet 42 are deformed temporarily and the one or more teeth of the geared portion 41a of the pawl 41 corresponding to the respective teeth of the geared portion 42a of the ratchet 42, are brought into engagement with the corresponding teeth of the regulating gear portion 12. Thus, even though the force or load applied to the upper arm is large, the relationship between the upper arm and the lower arm remains unchanged.

This invention has thus been shown and described with reference to a specific embodiment, however, it should be noted that the invention is in no way limited to the details of the illustrated structures. Changes and modifications may be made without departing from the scope of the appended claims, or their equivalents.

What is claimed is:

1. A seat reclining apparatus comprising:

a lower arm for attaching a seat-cushion;

an upper arm for attaching a seat-back;

a shaft rotatably disposed in the lower arm and fixed to the upper arm for unitary rotation with the upper arm;

a releasable locking mechanism for releasably restraining relative rotation between the lower and upper arms, said locking mechanism including a pawl slidably supported in a slot formed in one of the lower and upper arms and constrained for movement radially of the shaft into and out of meshing engagement with a a ratchet provided on one of the lower and upper arms, the meshing engagement receiving a force from the upper arm and the resultant force being transmitted to the lower arm via the pawl and a wall of the slot; and a regulating gear set formed on the other of the lower and upper arms and having a pitch circle larger than that of the ratchet so as to be engagable with the pawl while the pawl is in meshing engagement with the ratchet.

2. A seat reclining apparatus in accordance with claim 1, wherein the regulating gear is on the lower arm.

3. A seat reclining apparatus in accordance with claim 2, wherein the regulating gear is formed integrally with the lower arm.

* * * * *

UNITED STATES PATENT AND TRADEMARK OFFICE
CERTIFICATE OF CORRECTION

PATENT NO. : 5,558,402
DATED : September 24, 1996
INVENTOR(S) : Yukifumi YAMADA

It is certified that error appears in the above-indentified patent and that said Letters Patent is hereby corrected as shown below:

Claim 1, column 4, line 24, delete second occurrence of "a".

Column 3, line 27, after "arm", change "1" to --1--.

Signed and Sealed this

Twenty-fifth Day of March, 1997

Attest:

BRUCE LEHMAN

Attesting Officer

Commissioner of Patents and Trademarks